March 23, 1948.   W. C. REICHARD   2,438,350
TEST PROBE
Filed Aug. 22, 1945

INVENTOR.
William C. Reichard
BY Raymond N. Matson
AGENT

Patented Mar. 23, 1948

2,438,350

UNITED STATES PATENT OFFICE 2,438,350

TEST PROBE

William C. Reichard, Stanhope, N. J.

Application August 22, 1945, Serial No. 611,983

2 Claims. (Cl. 173—273)

This invention relates to electrical contact members and more specifically to test probes which are used in connection with apparatus for making electrical tests or measurements in confined spaces.

It is an object of this invention to provide an improved test probe which is simple to construct and which is particularly adapted for use in making contact with electrical wires or terminal members which are closely adjacent to other wires or terminal members.

In the art of testing radio and other electronic equipment, there has long been a need for a test probe which can quickly and easily, and without causing short-circuits, make contact with a wire or terminal member in the interior of a maze of wires and other electrical conducting members such as is commonly found in the chassis of a radio set. Moreover, the advent of the miniature vacuum tube has made the electronic equipment utilizing such tubes even more compact and the need for a suitable probe for testing them and for making contact with their sockets even more pressing. While various probes have been suggested and made for this purpose, none of them has the over-all advantages found in the improved probe of this invention.

It is another object of this invention to provide an improved probe which offers a minimum of contact surface while being moved to a contact point but which can be easily manipulated by the fingers of one hand to increase the contact surface.

It is still another object of this invention to provide a probe which has a novel contact head portion for making an excellent electrical contact and which probe has improved holding properties when compared with other easily detachable probes.

Other objects of the invention as well as various features thereof will be apparent from the description which follows.

In accordance with the invention, there is provided, by way of example for illustrative purposes, a novel test probe which has many advantages over those of the prior art. This probe is provided with a long metallic contact member terminating in a head portion which has a pointed member and a hook. The pointed member is adapted to make ready contact with miniature tube sockets and it may have a chiseled edge, if desired, to reduce slippage on round wires. The hook makes it possible to hook onto a desired portion of an electrical circuit, such as a wire or terminal. The interior surface of this hook is preferably formed into a blunt V or knife edge to improve the contact. The contact member is completely protected (except for the head) by means of an insulating sheath which can be moved, by means of a simple finger motion, in a direction away from the head, thus exposing more of the head end of the contact member. This construction makes it possible to keep the exposed contact surface at a minimum while passing the probe through a maze of wires and contact elements and to enlarge the contact area when desired. The end surface of the insulating sheath near the end can be roughened or serrated to improve the holding properties of the probe.

The invention will be more readily understood by referring to the following description taken in connection with the accompanying drawings forming a part thereof, in which.

Figure 1:
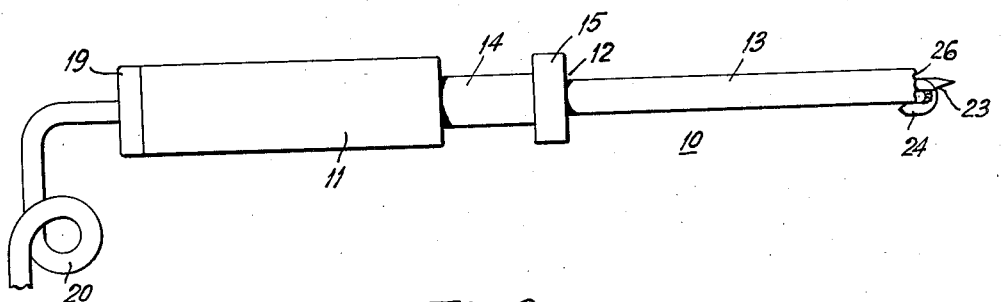
Fig. 1 is a side view of a probe in accordance with the invention.
Figure 2:
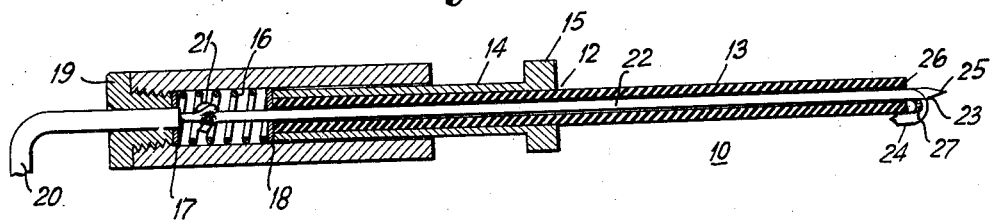
Fig. 2 is a cross-sectional view of the probe of Fig. 1.
Figure 3:
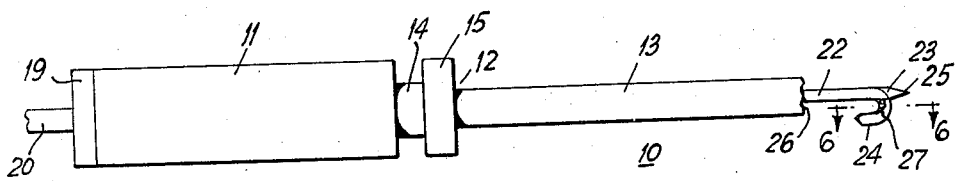
Fig. 3 is a side view of the probe of Fig. 1 showing the inner casing member in the retracted position.
Figure 4:
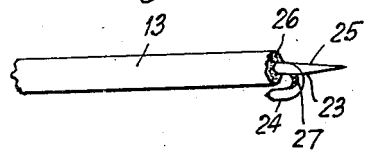
Figure 5:
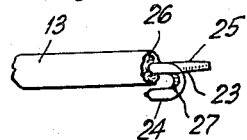
Figure 6:

Figs. 4 and 5 are perspective views of the head portions of contact members which are modifications of those shown in Figs. 1, 2 and 3; and Fig. 6 is an enlarged cross-sectional view taken in a plane through the line 6—6 in Fig. 3.

Referring more specifically to the drawings, Figs. 1, 2 and 3 show, by way of example for illustrative purposes and in side view, a probe or prod 10 in accordance with this invention. The probe comprises an outer cylindrical casing member 11 of any high grade insulating material which has an opening at one end thereof to receive an inner casing member 12 which comprises a hollow tube 13 of insulating material forced into, cemented or otherwise attached to a hollow tube 14 which is also of insulating material. The tube 14 is of such diameter that it makes a good sliding fit inside the outer casing 11 and is provided with a collar or other finger hold member 15 upon which a good finger grip can be obtained to move the member 14 back within the outer casing member 11 against the pressure of a spring 16 mounted between washers 17 and 18 therein. In the fully retracted position, the collar 15 assumes the position shown in Fig. 3.

The end of the casing member 11 remote from the collar 15 is closed by a cap 19 which has an opening therein through which a terminal wire 20 can pass. The wire 20, which is adapted to have its outer end connected to any suitable device such as an oscilloscope, is connected, by soldering for example, to a hook 21 on the end of a metal contact member 22. This contact member extends through the entire length of the tube 13 and terminates in a head 23. It will be readily appreciated that when the collar 15 is moved towards the outer casing member 11, by taking the collar between two fingers of one hand and moving it towards the base of the probe, for example, the head 23 has more of its surface exposed, as shown in Fig. 3, than when it is in the position of Figs. 1 and 2.

The head 23 of the contact member 22 is provided with a short hook 24 which is preferably pointed, as shown in the drawings, and may have about one half to two thirds of the inside of its neck formed into a blunt edge and the balance (preferably the part 27 substantially parallel to the end surface of the sheath 13) formed into a V or knife edge (see Fig. 6) to improve the contact. A spur point 25 is added to improve the usefulness of the probe so that contact in miniature tube socket holes can easily be made. A short slender point is desirable for this type connection (see Fig. 4). If desired, the member 25 can have a chisel edge to reduce slippage on round wires. This is shown in Fig. 5. Figs. 4 and 5 also show the end 26 of the insulating tube 13 roughened or serrated to give a good grip on a wire or lug terminal when the hook 24 is used for making electrical connections thereto.

The cap 19 is provided with an inner portion 27 which is a threaded sleeve, preferably tapered and slotted so that it will compress the insulation of the lead or terminal wire 20 when the cap 19 is screwed in tightly.

The member 13 is preferably made long and slender so that access can be had to contact elements well within the interior of a maze of wires in a radio chassis, for example, without causing short circuits. When the wire or member to which it is desired to make contact is found, the collar 15 can be moved back with two fingers of one hand (leaving the other fingers of the same hand and all of the other hand free for other purposes, such as manipulating other test probes, and reducing the danger of shock to the operator and damage to the equipment). This exposes more of the head 23 so that a wire can be partially encircled with the hook 24 and gripped tightly between this member and the serrated or roughened end 26 of the tubing 13 when the collar 15 is released and the spring 16 allowed to force the tube 13 to its protracted position (Fig. 1). The special shape of the inner edge of the hook improves the electrical contact since the V or knife edge 27 penetrates any films of oil, grease and the line. If the member to which it is desired to make contact is a miniature tube socket or a wire or other element that is impossible to encircle with the hook, the pointed or chiseled edge 25 is used. If the hook 24 is used with a wire or the pointed or chiseled edge 25 used with a socket opening, the probe will make sustained contact even though the hands are removed. The probe in accordance with the invention makes it possible to make fast connections and disconnections safely.

Various changes can be made in the embodiments described above without departing from the spirit of the invention, the scope of which is indicated in the appended claims.

What is claimed is:

1. An electrical contact member adapted to make contact with a wire or terminal member comprising a first insulating casing member which is open at one end thereof, a second insulating casing member adapted to make a sliding fit with said first casing member so as to move freely with respect thereto in a lateral direction, a metal contact member which has one end fastened within said first casing member to an electrical terminal and which extends through said opening in the end thereof and through said entire second casing member to terminate in a hook-shaped clip, and resilient means in the interior of said first casing member positioned to force said second casing member toward and sufficiently close to the inside surface of the hook of said clip so that the wire or terminal member can be tightly gripped between the end of said second casing member and the inside surface of said hook.

2. An electrical contact member adapted to make contact with a wire or terminal member comprising a first insulating casing member which is open at one end thereof, a second insulating casing member adapted to make a sliding fit with said first casing member so as to move freely with respect thereto in a lateral direction and having an end surface outside said first member, a metal contact member which has one end fastened within said first casing member to an electrical terminal and which extends through said opening in the end thereof and through said entire second casing member to terminate in a hook-shaped clip, and resilient means in the interior of said first casing member positioned to force said second casing member toward and sufficiently close to the inside surface of the hook of said clip so that the wire or terminal member can be tightly gripped between the end of said second casing member and the inside surface of said hook, a portion of the inner surface of the hook which is substantially parallel to the said end surface of the second casing member having a knife edge and portions of said clip inner surface on each side of said knife edge being blunt.

WILLIAM C. REICHARD.

REFERENCES CITED

The following references are of record in the file of this patent:

UNITED STATES PATENTS

| Number | Name | Date |
|---|---|---|
| 846,158 | Stewart | Mar. 5, 1907 |
| 1,027,090 | Waxbon | May 21, 1912 |
| 1,378,801 | Lamb | May 17, 1921 |
| 1,650,779 | Williams | Nov. 29, 1927 |
| 1,833,835 | Hieronymus | Nov. 24, 1931 |
| 2,105,833 | Feuer | Jan. 18, 1938 |
| 2,222,110 | Maurer | Nov. 19, 1940 |
| 2,292,236 | Martin | Aug. 4, 1942 |

FOREIGN PATENTS

| Number | Country | Date |
|---|---|---|
| 295,939 | Italy | May 3, 1932 |